US007007932B2

(12) United States Patent
Armstrong et al.

(10) Patent No.: US 7,007,932 B2
(45) Date of Patent: Mar. 7, 2006

(54) WALL-FLOW REDISTRIBUTOR FOR PACKED COLUMNS

(75) Inventors: Phillip Andrew Armstrong, Orefield, PA (US); Patrick Alan Houghton, Emmaus, PA (US); James William Meehan, Dallas, PA (US); George Amir Meski, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/627,044

(22) Filed: Jul. 25, 2003

(65) Prior Publication Data

US 2005/0017381 A1    Jan. 27, 2005

(51) Int. Cl.
B01F 3/04    (2006.01)
(52) U.S. Cl. .......................................... 261/97; 261/110
(58) Field of Classification Search .................. 261/97, 261/98, 99, 110, 111, 112.1, DIG. 85
See application file for complete search history.

(56) References Cited

U.S. PATENT DOCUMENTS

| 2,639,130 | A |   | 5/1953  | Heere |   |
|---|---|---|---|---|---|
| 2,955,987 | A |   | 10/1960 | Moreton et al. |   |
| 3,099,697 | A |   | 7/1963  | Lerman et al. |   |
| 3,446,489 | A |   | 5/1969  | Leva |   |
| 4,333,894 | A | * | 6/1982  | Hoppe et al. | 261/96 |
| 4,369,150 | A |   | 1/1983  | Harper | 261/97 |
| 4,427,605 | A | * | 1/1984  | Meier et al. | 261/97 |
| 4,432,913 | A | * | 2/1984  | Harper et al. | 261/97 |
| 5,132,055 | A |   | 7/1992  | Alleaume et al. | 261/97 |
| 5,158,713 | A | * | 10/1992 | Ghelfi et al. | 261/97 |
| 5,224,351 | A |   | 7/1993  | Jeannot et al. | 62/36 |
| 5,240,652 | A |   | 8/1993  | Taylor et al. | 261/97 |
| 5,464,573 | A |   | 11/1995 | Tokerud et al. | 261/97 |
| 5,585,046 | A | * | 12/1996 | Jansen et al. | 261/97 |
| 6,286,818 | B1 |  | 9/2001  | Buhlmann | 261/97 |
| 6,513,795 | B1 |  | 2/2003  | Sunder | 261/94 |
| 6,722,639 | B1 | * | 4/2004 | Ender et al. | 261/97 |
| 6,749,182 | B1 | * | 6/2004 | Larson et al. | 261/97 |

FOREIGN PATENT DOCUMENTS

DE    43 36 985 A    5/1969
EP    0879626       11/1998

(Continued)

OTHER PUBLICATIONS

Stoter et al., "Measurement and modeling of liquid distribution in structured packings", Chem. Eng. J. (1993) 53 55.
Bulletin 593 entitled "Distillation Pilot Plant Equipment" published by Distillation Engineering Company.

(Continued)

Primary Examiner—Scott Bushey
(74) Attorney, Agent, or Firm—Willard Jones, II

(57) ABSTRACT

An apparatus for collecting and redistributing a flow of a liquid descending in an exchange column containing a layer of structured packing and having a longitudinal axis, a cross-sectional area, and an inner wall having an inner perimeter, includes: a wall-flow collector located above the layer of structured packing, the wall-flow collector having an outer perimeter adjacent the inner perimeter of the inner wall and being adapted to collect at least a portion of the liquid descending on or near the inner wall of the exchange column; a transmission means for transmitting at least a portion of the collected liquid collected by the wall-flow collector toward the longitudinal axis a substantial distance across the cross-sectional area of the exchange column; and a dispensing means for dispensing at least a portion of the portion of the collected liquid from the transmission means to the layer of structured packing.

4 Claims, 10 Drawing Sheets

FOREIGN PATENT DOCUMENTS

| | | |
|---|---|---|
| EP | 0684060 | 12/1999 |
| EP | 0997189 | 5/2000 |
| EP | 0782877 | 9/2001 |
| GB | 961 442 A | 6/1964 |
| WO | 01/66213 | 9/2001 |

OTHER PUBLICATIONS

Bulletin 722 entitled "High Efficiency for: Fast Delivery, Lower Cost, More Theoretical Plates/Ft., Lower Pressure Drop, Higher Capacity, Lower Holdup, Lower Head Room" published by Distillation Engineering Company.

* cited by examiner

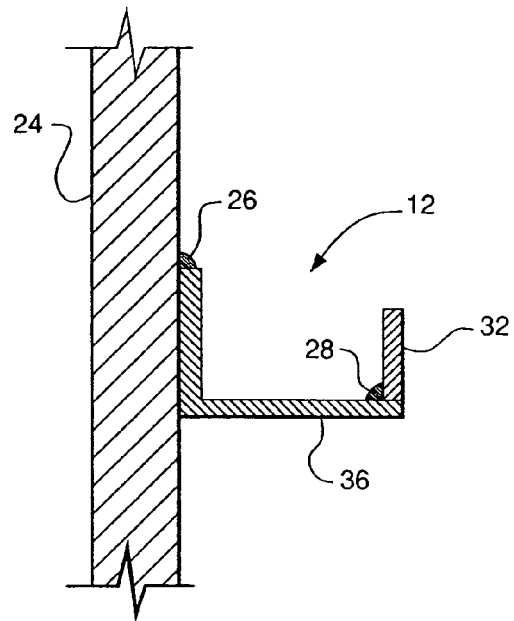
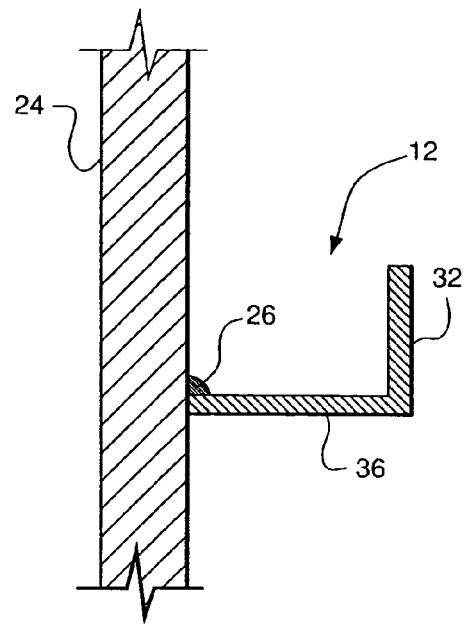
FIG. 3A        FIG. 3B
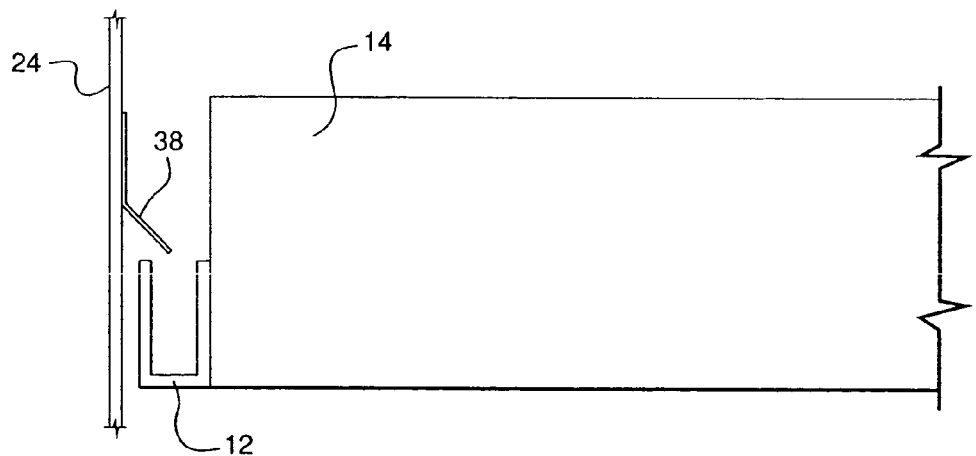
FIG. 3C

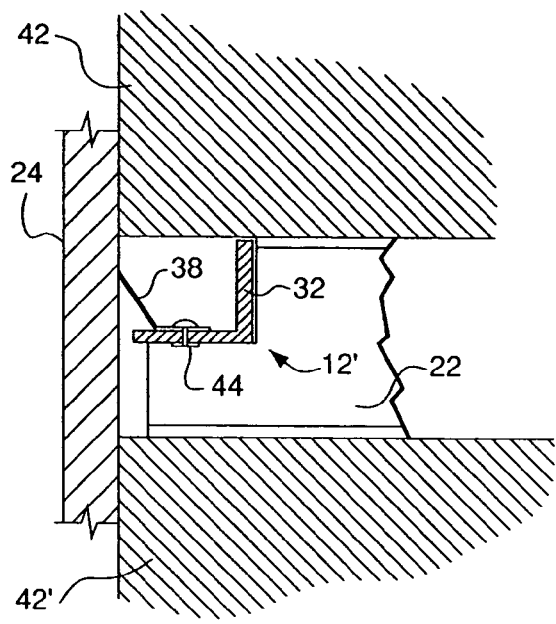 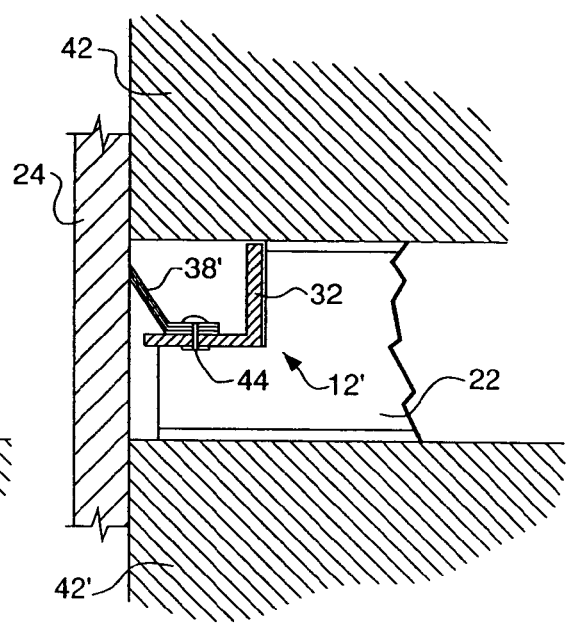
FIG. 4A  FIG. 4B
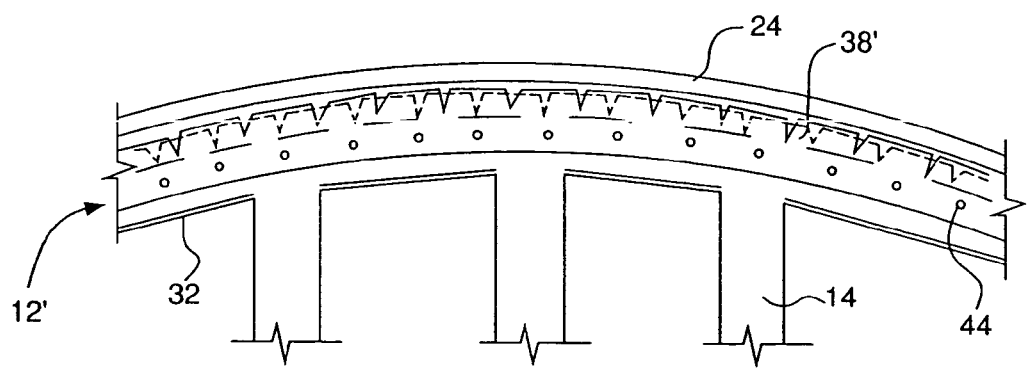
FIG. 4C

WALL-FLOW REDISTRIBUTOR FOR PACKED COLUMNS

BACKGROUND OF THE INVENTION

The present invention relates to an apparatus and a method for collecting and redistributing a flow of a descending liquid to a structured packing in an exchange column for heat and/or mass transfer processes. The apparatus and method have particular application in cryogenic air separation processes utilizing distillation, although the apparatus and method may be used in other heat and/or mass transfer processes. The present invention also relates to methods for assembling an apparatus for collecting and redistributing a flow of a descending liquid to a structured packing in an exchange column used in such processes.

The term "column", as used herein, means a distillation or fractionation column or zone, i.e., a column or zone wherein liquid and vapor phases are countercurrently contacted to effect separation of a fluid mixture, such as by contacting of the vapor and liquid phases on packing elements or on a series of vertically-spaced trays or plates mounted within the column.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of expanded metal or woven wire screen stacked in layers or as spiral windings; however, other materials of construction, such as plain sheet metal, may be used.

The terms "hole" and "aperture" are used interchangeably herein to mean an opening through which a fluid may pass. Although circular holes are shown in the drawings, the holes may have other shapes, including irregular as well as regular shapes.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen).

Various packings or trays may be used to bring the liquid and gaseous phases of the mixture into contact to accomplish mass transfer between the phases. The use of packing for distillation is standard practice and has many advantages where pressure drop is important. However, packed column performance is very dependent on creating and maintaining a balance between the downward flow of liquid and the upward flow of vapor locally in the packing. The distribution of the liquid and the vapor within the packing is influenced by the initial presentation of these fluids to the packing.

Initial presentation of liquid and vapor to the packing is usually made by means of distributors. A liquid distributor, the role of which is to irrigate the packing uniformly with liquid, is located above the packing, while a vapor distributor, the role of which is to create uniform vapor flow below the packing, is located below the packing.

Maldistribution of liquid in packed two-phase mass/heat transfer columns has long been recognized as leading to poor mass/heat transfer efficiency. Liquid maldistribution may be due to: initially presenting the liquid to the packing non-uniformly; maldistributed vapor flow which forces liquid maldistribution through the mechanism of vapor/liquid shear; and the packing itself, which has an inherent "natural distribution" to which the liquid distribution tends, regardless of initial liquid presentation. It is well known that liquid tends to accumulate near the walls of columns containing structured packing as shown in U.S. Pat. No. 6,286,818 B1 (Buhlman), U.S. Pat. No. 6,513,795 B2 (Sunder), and numerous publications in the published literature (e.g., Stoter et al., "Measurement and modeling of liquid distribution in structured packings," Chem. Eng. J. (1993) 53 55).

Various approaches in the prior art address liquid accumulation near or on the wall of the column. The approaches fall into three categories: A) those that attempt to redirect the liquid which is on or near the wall back into the packing locally; B) those that attempt to re-collect all of the liquid flowing in the packing and on/near the wall, mix it to some degree, and redistribute it; and C) other approaches. The three categories are discussed below.

Category A: Re-introduction of Liquid Locally

The theory behind this common approach is that the liquid flowing on the wall or along the outer periphery of the structured packing can be re-introduced at the periphery of the packing and will naturally flow back into the bulk of the packed bed. Most structured packings used in this approach include one or more short bands of "wall-wiper" material (typically a metal foil or gauze) which is folded against the inside diameter of the column and against the periphery of the structured packing to reduce "liquid and vapor bypass."

U.S. Pat. No. 5,224,351 (Jeannot, et al.) discloses several types of wall-wipers that collect liquid from the wall and wall region of the packing and attempt to re-introduce the liquid within the same packing layer or at the periphery of the layer below. These approaches have a claimed advantage of reducing vapor by-pass, as disclosed in EP997189 A1 (Klotz, et al.) However, as taught in U.S. Pat. No. 6,286,818 B1 (Buhmann), these conventional designs still result in accumulation of liquid on the wall or near-wall region of the packing. Furthermore, the "wall-wiper" must be applied to each layer, or very frequently along the height of the packed bed. Applicants believe that the inefficiency of this approach lies in the fact that the liquid re-introduced to the packing from the wall or near-wall region enters the packing at the outer periphery, and will just as likely flow back toward the wall/near-wall region as flow toward the center of the column.

Modifications of the edge of the packing also have been proposed as a means for redirecting the liquid back into the packing. Specific geometries for edge region folding and cutting and tools for producing these features have been disclosed in U.S. Pat. No. 5,224,351 (Jeannot, et al.). This approach is penalized by the increased cost for tooling and special handling of each sheet of structured packing, as well as the increased assembly costs associated with the individual segments (or "bricks") of structured packing which must necessarily be assembled with the specific orientation mandated by the edge modification. Furthermore, as in the "wall-wiper" approach, the packing-edge-modification approach relies on the redirected liquid to tend to flow toward the center of the column cross-section after redirection, whereas the liquid actually may flow either to or away from the wall and tend to flow toward the wall in net.

Finally, baffles which extend a small distance into the packing from the inside diameter of the column may be added to redirect liquid flow, as disclosed in EP0684060 B1. This approach suffers from the same shortcomings as the previously described approaches, which tend to re-introduce liquid close to the wall region where the liquid may re-accumulate rapidly.

Category B: Liquid Collectors/redistributors

The approaches in this category require a liquid collection/mixing/re-distribution device to handle the entire liquid flow in the column while attempting to minimize perturbations on the distribution of ascending vapor in the column. The devices tend to be large and include many massive parts, and thus incur large manufacturing costs and the added costs associated with additional column height.

U.S. Pat. No. 5,240,652 (Taylor, et al.) is an example of a "standard" approach to liquid distribution in packed columns. Liquid is captured from the entire cross-section of the packing in a "pre-distributor," which then mixes the entire liquid flow in a trough or pot before distributing the liquid somewhat crudely to a secondary distributor, which then distributes the entire liquid flow to the packing below with a high degree of uniformity. Vapor risers penetrate both the pre-distributor and the secondary distributor. The cost associated with the column height required to get uniform liquid flow across the column cross-section from the secondary distributor and to accommodate the pre-distributor is very significant. Furthermore, manufacturing and installation costs for this type of design also are high. Because of the high costs, these distributors are only used at the top of a packed section in which liquid streams are introduced or withdrawn, or to interrupt a very tall packed section so as to effect complete mixing and re-distribution at an intermediate point in the tall packed section.

EP0782877 B1 (Billingham, et al.) is a variant of the standard liquid distributor design (U.S. Pat. No. 5,240,652) in which a baffle is suspended above the distributor to effect enhanced liquid mixing.

EP0684060 B1 is a variant of the standard liquid distributor design, in which the irrigation hole density is varied across the cross-section of the column to reduce the resulting maldistribution created by the wall/near-wall region of the packing.

U.S. Pat. No. 5,464,573 (Tokerud, et al.) is an alternative to the standard liquid distributor design and is used to save column height/cost. Use of a pre-distributor is avoided by capturing liquid directly from the packing located above by vanes on every trough. In one embodiment, an annular ring is used to capture liquid flowing on the wall. The ring is fitted with features (e.g., lateral troughs) to direct the liquid into the bulk of the liquid distributor.

EP0879626 A2 (Hine, et al.) is an alternative to the standard liquid distributor design and is used to save column height/cost. Use of a pre-distributor is avoided by partially mixing the captured liquid within a series of small troughs on top of the vapor risers.

U.S. Pat. No. 5,132,055 (Alleaume, et al.) discloses a liquid distributor which also acts as a support for the packed section above. The distributor consists of a heavy plate which extends almost entirely across the column cross-section. The plate is fitted with sturdy, inverted troughs for vapor flow and packing support. Holes in the bottom of the plate distribute the liquid to the packing below. The distributor is sealed to the column periphery such that liquid flowing on the wall of the column is captured with the rest of the liquid descending from the packing. There is no pre-distributor, and no special means for mixing liquid captured from the wall with the rest of the captured liquid.

U.S. Pat. No. 5,224,351 (Jeannot, et al.) discloses a means to capture liquid flowing on the wall or packing periphery of a packed section located above a liquid distributor as described in U.S. Pat. No. 5,132,055 (Alleaume, et al.), with special provision to bring the captured liquid into the center of the distributor to effect better mixing with the bulk liquid collected in the distributor.

Category C: Other Approaches

These approaches to redistribution require the use of a different type or density of packing between two larger sections of predominant packing. The main drawback of these approaches is that they do not specifically address the maldistribution associated with the column wall/packing periphery.

U.S. Pat. No. 6,286,818 B1 (Buhlmann) discloses a means to redistribute liquid in a packed section by using a short section of packing which is dissimilar from the rest of the packed section. The packing used in the short section is intended as a means of redistribution of liquid. U.S. Pat. No. 6,513,795 B2 (Sunder) discloses a means to correct liquid maldistribution by using "mixed resistance structured packing" consisting of structured packing with low resistance to flow in the central core of the column and structured packing with high resistance to flow in the outer annulus surrounding the central core. Both of these approaches attempt to address liquid maldistribution by changing the characteristics of the structured packing within the column, but no special provisions are made to address the predominance of liquid on the wall of the column or in the near-wall region of the packing.

WO 0166213 A1 also proposes the use of packing as a distribution means by making use of hydraulic flooding. Hydraulic flooding occurs when the hydrodynamic shear of the upwardly flowing vapor on the downwardly flowing liquid balances the tendency of the liquid to flow downward because of gravity. What results is a locally high density of liquid approaching the density of the liquid froth found on standard perforated distillation trays. This reference teaches use of a short section of high density packing between two taller sections of lower density packing to create local flooding conditions in the high density packing and thereby redistribute the liquid more uniformly in the lower packed section. No special provisions are made for capturing liquid flowing on or near the wall of the column. A disadvantage of this approach is that it introduces additional pressure drop into the vapor phase as it passes through the high density (flooded) packing.

The categories of the three approaches are summarized in the Table below, which includes the associated disadvantages/shortcomings of each approach.

| Category | Description | Disadvantage/Shortcoming |
| --- | --- | --- |
| A. Re-introduction of liquid locally | Devices or packing features located at the packing periphery act to re-introduce liquid to the packing | The liquid is re-introduced close to the wall of the column at the packing periphery where it is likely to return to the wall region very quickly after redistribution. |

-continued

| Category | Description | Disadvantage/Shortcoming |
|---|---|---|
| B. Liquid collectors/ redistributors | These are devices which capture all of the liquid flowing from a packed section, and, to varying degrees, attempt to mix it and redistribute it. | Because these devices handle the full liquid flow, they are necessarily big, complicated, and therefore costly. |
| C. Other approaches | Different types/densities of packing have been proposed as redistributors within sections of predominantly other packings | This approach does not explicitly handle the maldistribution associated with the wall flows, and thus does not address the major mechanism contributing to liquid maldistribution in packings. |

It is desired to have an apparatus and a method for collecting and redistributing a flow of a liquid descending in an exchange column which captures the liquid on the wall of the column or the region of the structured packing in the column to redistribute the liquid far into the interior of the structured packing away from the column wall.

It is further desired to have an apparatus and a method for collecting and redistributing a flow of a liquid descending in an exchange column which requires relatively little additional column height and associated costs.

It is still further desired to have an apparatus and a method for collecting and redistributing a flow of a liquid descending in an exchange column which does not cause a significant added pressure drop in the vapor ascending in the column.

It is still further desired to have an apparatus and method for collecting and redistributing a flow of a liquid descending in an exchange column which can be integrated with conventional holddown grate/support grate designs.

It is still further desired to have an apparatus and a method for collecting and redistributing a flow of liquid descending in an exchange column which decrease the likelihood of malperformance caused by gross liquid maldistribution in a packed column by mitigating the effects of liquid maldistribution.

It is still further desired to have a new, more efficient apparatus and method for collecting and redistributing a flow of a liquid descending in an exchange column.

It is still further desired to have an apparatus and a method for collecting and redistributing a flow of a liquid descending in an exchange column which overcome the difficulties, problems, limitations, disadvantages, and deficiencies of the prior art to provide better and more advantageous results.

It is still further desired to have a method for assembling an apparatus for collecting and redistributing a flow of a liquid descending in an exchange column which affords better liquid distribution than the prior art, and which also overcomes many of the difficulties and disadvantages of the prior art to provide better and more advantageous results.

It is still further desired to have an apparatus and a method for collecting and redistributing a flow of a liquid descending in an exchange column which show high performance characteristics for cryogenic applications, such as those used in air separation, and for other heat and/or mass transfer applications.

It also is desired to have a more efficient air separation process utilizing an apparatus for collecting and redistributing liquid which is more efficient than the prior art.

BRIEF SUMMARY OF THE INVENTION

The invention is an apparatus and a method for collecting and redistributing a flow of a liquid descending in an exchange column to a layer of structured packing in the exchange column. The invention also includes a method for assembling such an apparatus.

There are several embodiments of the apparatus and variations thereof. In a first embodiment, the apparatus for collecting and redistributing a flow of a liquid descending in an exchange column having a longitudinal axis, a cross-sectional area, and a inner wall having an inner perimeter, the exchange column containing at least one layer of structured packing having an exterior surface spaced apart from the interior perimeter of the inner wall, includes three elements. The first element is a wall-flow collector disposed in the exchange column above the layer of structured packing, the wall-flow collector having an outer perimeter adjacent the inner perimeter of the inner wall and being adapted to collect at least a portion of the liquid descending on or near the inner wall of the exchange column. The second element is a transmission means disposed in the exchange column for transmitting at least a portion of the collected liquid collected by the wall-flow collector toward the longitudinal axis a substantial distance across the cross-sectional area of the exchange column. The third element is a dispensing means for dispensing at least a portion of the portion of the collected liquid from the transmission means to the layer of structured packing.

There are several variations of the first embodiment of the apparatus. In one variation, the wall-flow collector is fixedly attached to the inner wall of the exchange column. In another variation, the wall-flow collector is movable in a vertical direction along the longitudinal axis within the exchange column.

In yet another variation, the transmission means comprises a plate, at least a portion of the plate being in fluid communication with the wall-flow collector, the plate extending across at least a portion of the cross-sectional area of the exchange column, and the dispensing means comprises at least one aperture in the plate. In another variation, the transmission means comprises at least one extended wiper attached to the wall-flow collector, the extended wiper penetrating across at least a portion of the cross-sectional area of the column toward the longitudinal axis.

In still yet another variation, the transmission means comprises at least one trough in fluid communication with the wall-flow collector, the trough extending across at least a portion of the cross-sectional area of the exchange column, and the dispensing means comprises at least one aperture or overflow notch in each trough. In a variant of this variation, the apparatus also includes at least one wiper adjacent the inner wall of the exchange column or the exterior surface of the structured packing, the wiper being located above the trough and adapted to transfer at least a portion of the liquid descending on or near the inner wall into the trough.

In a second embodiment, the apparatus for collecting and redistributing a flow of a liquid descending in an exchange column having a longitudinal axis, a cross-sectional area, and an inner wall having an inner perimeter, the exchange column containing a first layer of structured packing and a second layer of structured packing above the first layer of structured packing, each of the first and second layers of structured packing having an exterior surface spaced apart from the inner wall, includes two elements. The first element is a wall-flow collector disposed in the exchange column above the first layer of structured packing and below the second layer of structured packing, the wall-flow collector adapted to collect at least a portion of the liquid descending on or near the inner wall of the exchange column. The second element is at least one member disposed in the exchange column between the first layer of structured packing and the second layer of structured packing, each member adapted to support at least a portion of the second layer of structured packing and to transmit at least a portion of the collected liquid collected by the wall-flow collector toward the longitudinal axis a substantial distance across the cross-sectional area of the exchange column. In a variation of this embodiment, the member is a beam having a first end, a second end opposite the first end, and an elongated channel between the first end and the second end, the elongated channel being in fluid communication with the wall-flow collector.

A third embodiment of the apparatus is similar to the second embodiment but includes at least one aperture in each member for dispensing at least a portion of the collected liquid from the member to the layer of structured packing.

A fourth embodiment of the apparatus for collecting and redistributing a flow of a liquid descending in an exchange column having a longitudinal axis, a cross-sectional area, and an inner wall having an inner perimeter, the exchange column containing a first layer of structured packing and a second layer of structured packing above the first layer of structured packing, each of the first and second layers of structured packing having an exterior surface spaced apart from the inner wall, includes four elements. The first element is a wall-flow collector disposed in the exchange column above the first layer of structured packing and below the second layer of structured packing, the wall-flow collector being fixedly attached to the inner wall and adapted to collect at least a portion of the liquid descending on or near the inner wall of the exchange column. The second element is at least one beam disposed in the exchange column between the first layer of structured packing and the second layer of structured packing, each beam adapted to support at least a portion of the second layer of structured packing and each member having a first end, a second end opposite the first end, and an elongated channel, having an open top and a floor, between the first end and the second end, the elongated channel being in fluid communication with the wall-flow collector and adapted to transmit at least a portion of the collected liquid collected by the wall-flow collector toward the longitudinal axis a substantial distance across the cross-sectional area of the exchange column. A third element is at least one aperture in the floor of the channel of each beam for dispensing at least a portion of the collected liquid from the channel of the beam to the layer of structured packing. The fourth element is at least one wiper adjacent the inner wall of the exchange column or the exterior surface of the structured packing, the wiper being located above the beam and adapted to transfer at least a portion of the liquid descending on or near the inner wall into the channel of the beam.

A fifth embodiment of the apparatus for collecting and redistributing a flow of a liquid descending in an exchange column having a longitudinal axis, a cross-sectional area, and an inner wall having an inner perimeter, the exchange column containing a first layer of structured packing and a second layer of structured packing above the first layer of structured packing, each of the first and second layers of structured packing having an exterior surface spaced apart from the inner wall, includes four elements. The first element is a wall-flow collector disposed in the exchange column above the first layer of structured packing and below the second layer of structured packing, the wall-flow collector being movable in a vertical direction along the longitudinal axis within the exchange column and adapted to collect at least a portion of the liquid descending on or near the inner wall of the exchange column. The second element is at least one beam disposed in the exchange column between the first layer of structured packing and the second layer of structured packing, each beam adapted to support at least a portion of the second layer of structured packing and each beam having a first end, a second end opposite the first end, and an elongated channel, having an open top and a floor, between the first end and the second end, the elongated channel being in fluid communication with the wall-flow collector and adapted to transmit at least a portion of the collected liquid collected by the wall-flow collector toward the longitudinal axis a substantial distance across the cross-sectional area of the exchange column. The third element is at least one aperture in the floor of the channel of each beam for dispensing at least a portion of the collected liquid from the channel of the beam to the layer of structured packing. The fourth element is at least one wiper adjacent the inner wall of the exchange column or the exterior surface of the structured packing, the wiper being located above the beam and adapted to transfer at least a portion of the liquid descending on or near the inner wall into the channel of the beam.

Another aspect of the invention is an exchange column for exchanging heat and/or mass between a vapor and a liquid descending in the exchange column having a longitudinal axis, a cross-sectional area, and an inner wall having an inner perimeter. The exchange column contains a group of internals, including four elements. The first element is at least one layer of structured packing having an exterior surface spaced apart from the inner perimeter of the inner wall. The second element is a wall-flow collector above the layer of structured packing, the wall-flow collector having an outer perimeter adjacent the inner perimeter of the inner wall and being adapted to collect at least a portion of the liquid descending on or near the inner wall of the exchange column. The third element is a transmission means for transmitting at least a portion of the collected liquid by the wall-flow collector toward the longitudinal axis a substantial distance across the cross-sectional area of the exchange column. The fourth element is a dispensing means for dispensing at least a portion of the portion of the collected liquid from the transmission means to the layer of the structured packing.

The method for collecting and redistributing a flow of a liquid descending in an exchange column to a layer of structured packing disposed in the exchange column, the exchange column having a longitudinal axis, a cross-sectional area, and an inner wall having an inner perimeter, includes multiple steps. The first step is to introduce the liquid into the exchange column at a first location. The second step is to position a layer of structured packing in the exchange column below the first location, the layer of structured packing having an exterior surface spaced apart from the inner perimeter of the inner wall. The third step is to position a wall-flow collector in the exchange column above the layer of structured packing and below the first location, the wall-flow collector having an outer perimeter adjacent the inner perimeter of the inner wall and being adapted to collect at least a portion of the liquid descending on or near the inner wall of the exchange column. The fourth step is to position a transmission means in the exchange column adjacent the wall-flow collector, the transmission means adapted to transmit at least a portion of the collected liquid collected by the wall-flow collector toward the longitudinal axis a substantial distance across the cross-sectional area of the exchange column. The fifth step is to collect in the wall-flow collector at least a portion of the liquid descending on or near the inner wall. The sixth step is to transmit a substantial portion of the collected liquid collected in the wall-flow collector toward the longitudinal axis a substantial distance across the cross-sectional area of the exchange column. The seventh step is to provide a dispensing means for dispensing at least a portion of the portion of the collected liquid from the transmission means to the layer of structured packing. The eighth step is to dispense the at least a portion of the portion of the collected liquid from the transmission means to the layer of structured packing.

Another aspect of the invention is a process for cryogenic air separation comprising contacting a flow of a descending liquid and a counter-current flow of an ascending vapor in at least one distillation column containing at least one mass transfer zone, wherein liquid-vapor contact is established by at least one layer of structured packing, and wherein at least a portion of the flow of the descending liquid is collected and redistributed to the structured packing by an apparatus such as that in any of the embodiments of the apparatus or variations thereof discussed above.

The method for assembling an apparatus for collecting and redistributing a flow of a liquid descending in an exchange column to a layer of structured packing in the exchange column, the exchange column having a longitudinal axis, a cross-sectional area, and an inner wall having an inner perimeter, includes multiple steps. The first step is to provide the exchange column. The second step is to provide the layer of structured packing in the exchange column, the layer of structured packing having an exterior surface spaced apart from the inner perimeter of the inner wall. The third step is to install a wall-flow collector in the exchange column above the layer of structured packing, the wall-flow collector having an outer perimeter adjacent the inner perimeter of the inner wall and being adapted to collect at least a portion of the liquid descending on or near the inner wall of the exchange column. The fourth step is to install a transmission means in the exchange column for transmitting at least a portion of the collected liquid collected by the wall-flow collector toward the longitudinal axis a substantial distance across the cross-sectional area of the exchange column. The fifth step is to install a dispensing means for dispensing the at least a portion of the portion of the collected liquid from the transmission means to the layer of the structured packing.

BRIEF DESCRIPTION OF SEVERAL VIEWS OF THE DRAWINGS

The invention will be described by way of example with reference to the accompanying drawings, in which:

FIGS. 3A and 3B are schematic diagrams illustrating cross-sectional views of a wall-flow collector of the present invention attached to a column wall by two different means;

FIG. 3C is a schematic diagram illustrating one embodiment of the present invention using a fixed wall-flow collector and a flexible wiper attached to the column wall;

FIG. 4A is a schematic diagram illustrating a cross-sectional view of one embodiment of a floating wall-flow collector with a single wiper;

FIG. 4B is a schematic diagram illustrating a cross-sectional view of another embodiment of a floating wall-flow collector using two flexible wipers;

FIG. 4C is a schematic diagram illustrating a plan view of another embodiment of a floating wall-flow collector using staggered double wipers;

DETAILED DESCRIPTION OF THE INVENTION

The present invention addresses the need to collect descending liquid from the column wall and/or near-wall region in the packed section of an exchange column and to redistribute that liquid toward the center of the column (i.e., away from the wall). The present invention achieves such liquid redistribution without incurring high manufacturing costs and/or significant costs associated with additional column height.

The redistributor of the present invention removes liquid from the column wall and from the packing in a zone near the column wall and transports the liquid farther into the center of the column than the existing wiper designs. The height of the redistributor is relatively modest—about 100 mm at most. Although the redistributor reduces the gross liquid maldistribution in the column by redirecting liquid flowing on the wall toward the center of the column, the redistributor is not intended to approach the degree of uniformity achieved by standard liquid distributors. Redistributors of the present invention do not collect the entire liquid flow and they are intended to be deployed after every ten or so layers of structured packing.

Figure 1A:
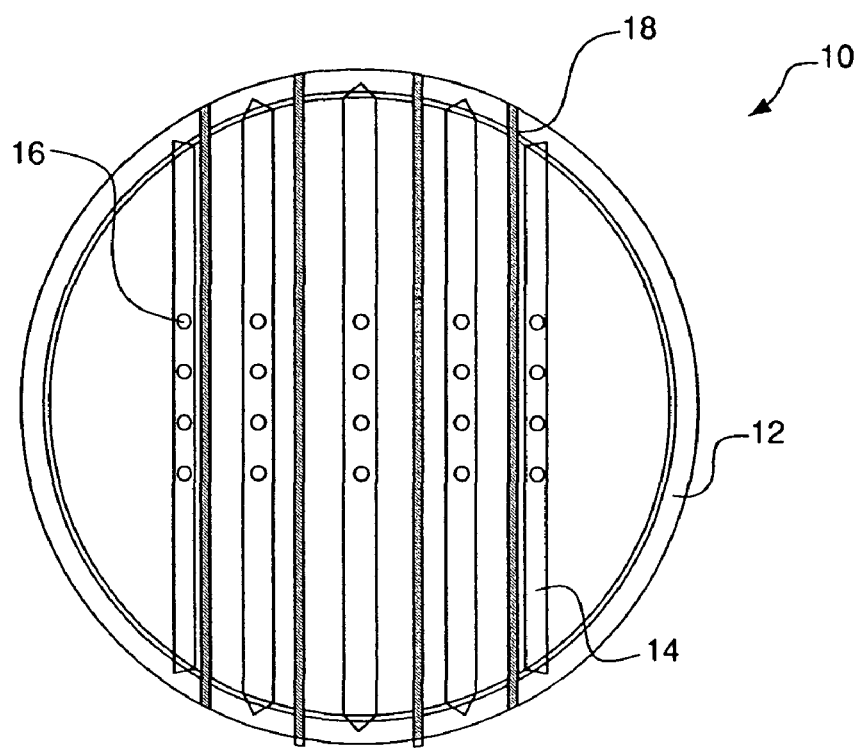
FIG. 1A is a schematic diagram illustrating a plan view of one embodiment of a Category I redistributor of the present invention.
Figure 1B:
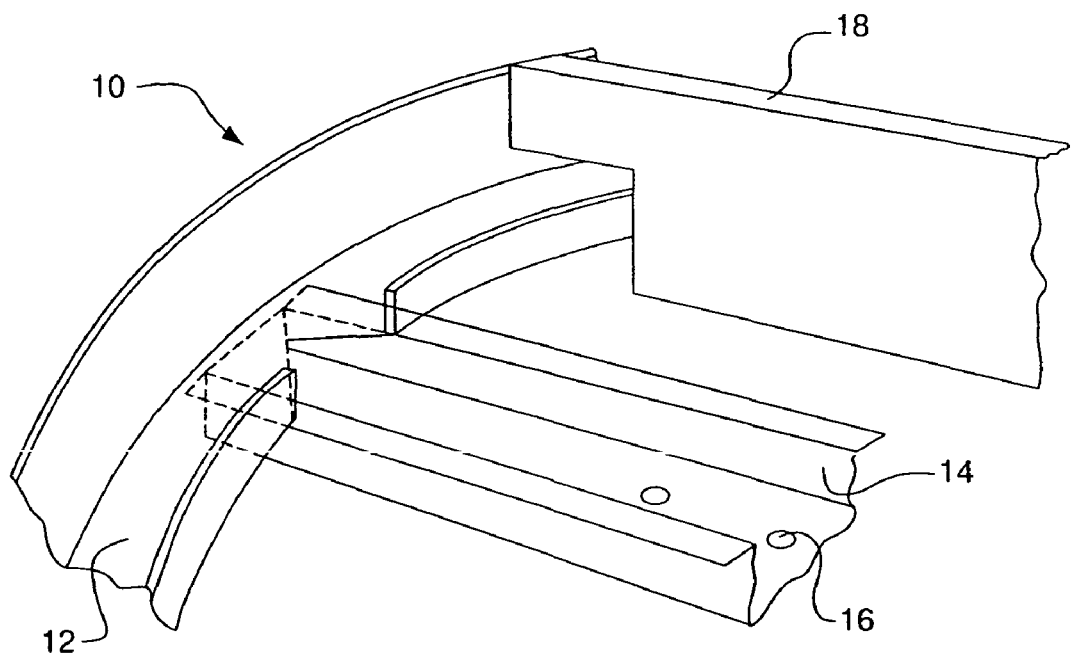
FIG. 1B is a schematic diagram of a perspective view of a portion of the redistributor shown in FIG. 1A.
Figure 2A:
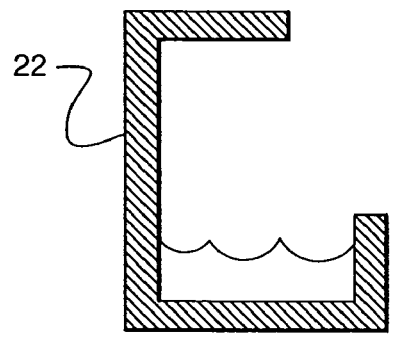
FIGS. 2A–2E are schematic diagrams of cross-sectional views of combination troughs/structural beams used in Category I redistributors of the present invention, such as that shown in FIGS. 1A and 1B.
Figure 2B:
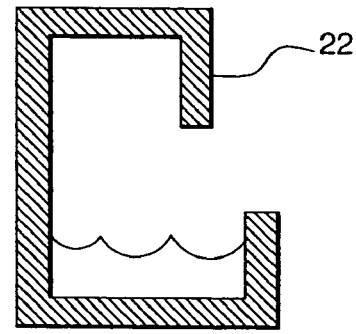
Figure 2C:
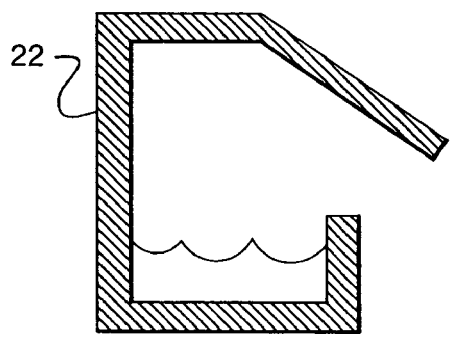
Figure 2D:
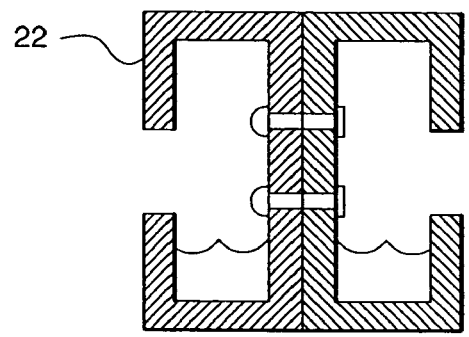
Figure 2E:
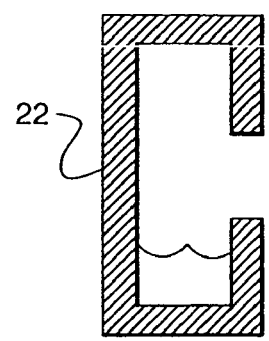

The designs of the redistributor of the present invention fall into three categories:
I. Troughs hanging from a wall-flow collector
   a. fixed designs
   b. floating designs
II. Perforated deck hanging from a wall-flow collector
   a. fixed designs
   b. floating designs
III. Extended wiper Category I redistributors comprise a series of troughs attached to a wall-flow collector. FIGS. 1A and 1B show one embodiment of this type of redistributor 10. The liquid collected at the wall of the column (not shown) by the wall-flow collector 12, flows into the troughs 14, is transported across the column cross-section, and flows out of the troughs through holes 16 or overflow notches to the structured packing (not shown) below. A system of support/hold-down beams 18 is integrated with the troughs to support and hold down the structured packing above and below the redistributor. The support/hold-down beams may serve both as troughs and as structural support members. Examples of such combination troughs/structural support beams 22 are shown in FIGS. 2A–2E.

The two designs, fixed and floating, refer to the wall-flow collector 12, which may be either fixed to the wall of the column or "floating" with the section of structured packing, i.e., allowed to move with the packing if shifting occurs. An example of a fixed wall-flow collector is a piece of rolled angle, which allows the wall-flow collector to be seal-welded to the column wall. A vertical lip running around the column on the inside edge allows the liquid to be captured and directed into any of the attached troughs.

Several methods of attaching a fixed wall-flow collector 12 to a column wall 24 are shown in FIGS. 3A–3C. With the wall-flow collector fixed, the support/hold-down beams must be sized for the shipping/operating load of at least some of the adjacent packing layers.

In FIGS. 3A and 3B, the wall-flow collector 12 is attached to the column wall 24 by a tack or seal weld 26. In FIG. 3A, the short inner wall 32 of the wall-flow connector 12 is connected to the floor 36 by a seal weld 28. In FIG. 3C, a flexible wiper 38 is attached to the wall 24 to divert liquid into the wall-flow collector 12.

An example of a floating wall-flow collector 12 is shown in FIGS. 4A–4C. In this case, the redistributor is allowed to move up and down in the column with the structured packing, should the packing shift slightly under load. The support/hold-down beams only serve to maintain the distance between the adjacent packing layers, and therefore need not be nearly as large as for the fixed wall-flow collector.

Referring to FIGS. 4A–4C, the body of the floating wall-flow collector 12' may be a piece of rolled angle with an inner vertical lip forming a short inner wall 32, as in the fixed wall-flow collector, except that the angle piece is not welded to the column wall 24. Instead, one or more flexible wipers (38, 38'), similar to the wall-wipers which are attached to packing segments, are tack-welded or attached by a rivet 44 to the rolled angle and make intimate contact with the column wall. In one embodiment, two flexible wipers 38' are superimposed on one another so that their tabs and slits are staggered with respect to each other as shown in FIG. 4C, thus making a more effective liquid seal. The flexible wipers are not welded to the column wall—only friction restricts their vertical motion.

Two embodiments of a floating wall-flow collector type of redistributor 10 are shown in FIGS. 5A–5B and FIGS. 6A–6B. In both embodiments, troughs are connected to a wall-flow collector 12' fitted with one or more flexible wipers 38. The troughs are troughs/structural support beams 22, which maintain the spacing between adjacent layers of structured packing.

Figure 5A:
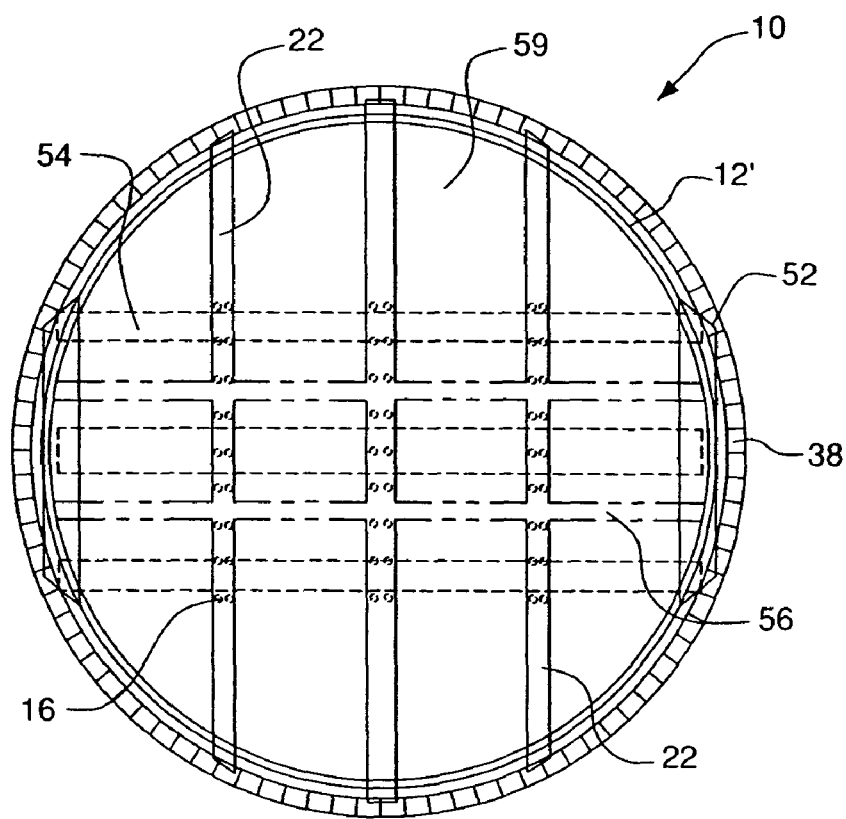
FIG. 5A is a schematic diagram illustrating a plan view of another embodiment of a Category I redistributor in which liquid transport troughs are attached to a floating wall-flow collector.
Figure 5B:
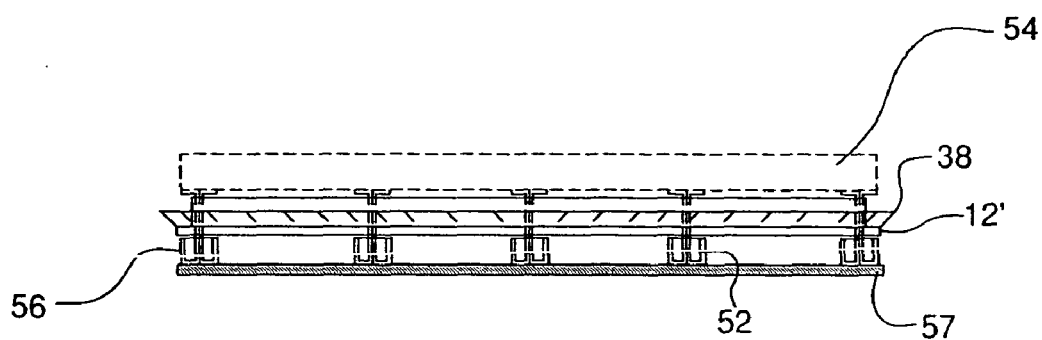
FIG. 5B is a schematic diagram illustrating a side view of a the Category I redistributor shown in FIG. 5A.

In FIGS. 5A–5B, a parallel arrangement of three trough/structural support beams 22 is used. Two additional short support beams 52 are placed on each side and parallel to the three trough/support beams for strength, and three temporary braces 54 are used for hoisting and installation. The actual number of troughs will depend on several factors, including the expected liquid accumulation at the wall and the number of required support points for the specific packing segmentation pattern in the column. For example, in the embodiment shown in FIG. 5A, there is a series of optional liquid transport troughs 56 perpendicular to the troughs/structural support beams 22, which include holes 16. In this embodiment, the opening 59 is available for ascending vapor flow.

Figure 6A:
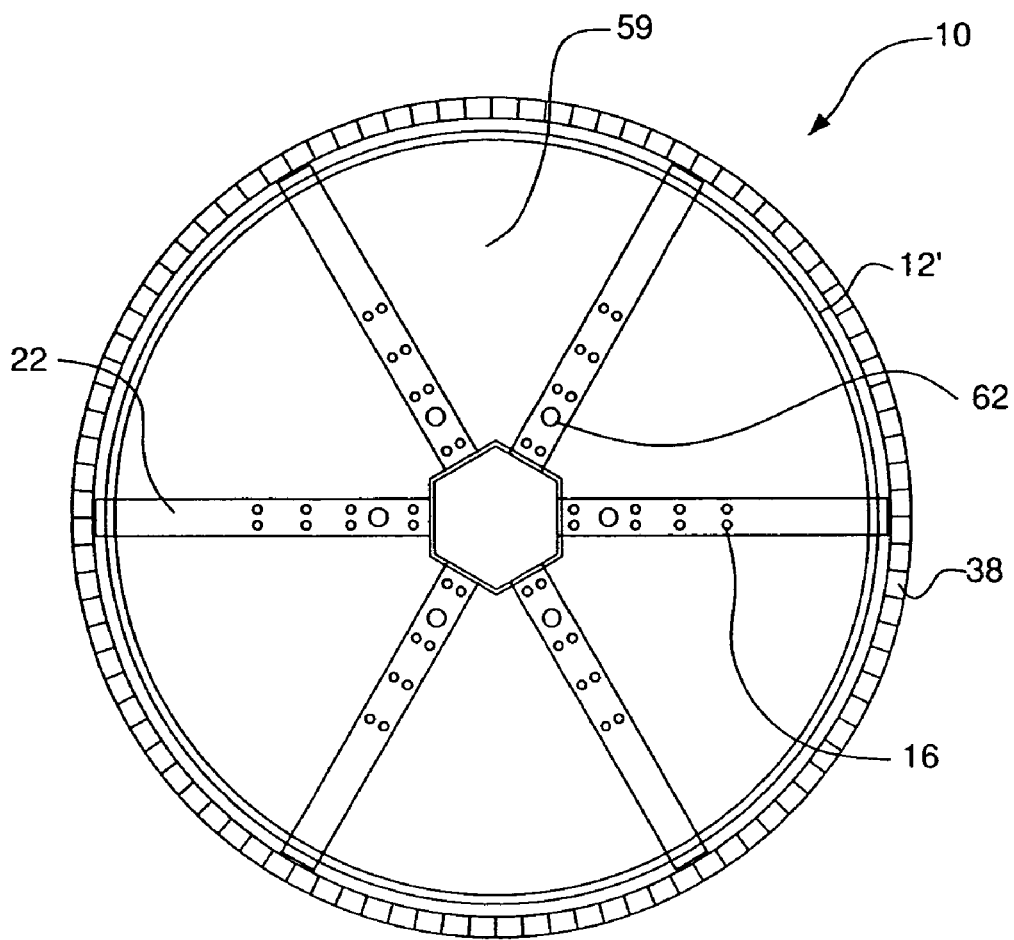
FIG. 6A is a schematic diagram illustrating a plan view of another embodiment of a Category I redistributor with a hexagonal trough arrangement and a floating wall-flow collector.
Figure 6B:
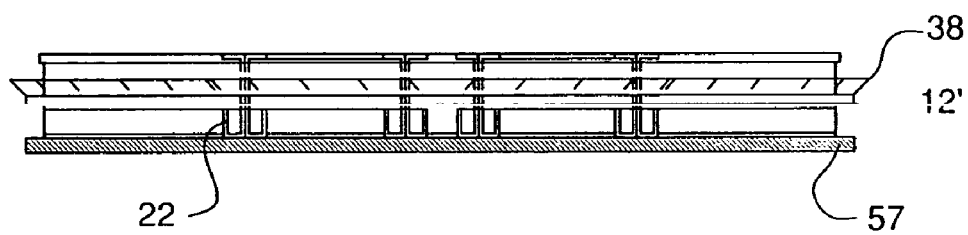
FIG. 6B is a schematic diagram illustrating a side view of the Category I redistributor shown in FIG. 6A.

The redistributor 10 shown in FIGS. 6A–6B is similar, except that the trough/structural support beams 22 are arranged in a hexagonal fashion to take advantage of existing manufacturing infrastructure which is suited to handling large, radially symmetric equipment. Holes 62 may be provided for hoisting and installation.

In both embodiments (FIGS. 5A–5B and 6A–6B), optional spacer bars 57 are shown in the side views which may be used to space the underside of the troughs off of the structured packing (not shown) a few millimeters. Such spacing reduces the interference by the structured packing on the flow through the holes 16. Table 1 shows the hole requirements for a redistributor 10 depending on column diameter.

TABLE 1

Hole Requirements for a Maximum 25 mm Liquid Level in Redistributor*

| Column ID (mm) | No. Holes | Hole Density ($ft^{-2}$) | Hole Diameter (mm) |
| --- | --- | --- | --- |
| 200 | 2 | 5.9 | 2.2 |
| 900 | 15 | 2.19 | 3.6 |
| 1500 | 26 | 1.37 | 4.5 |
| 2500 | 64 | 1.21 | 4.8 |
| 3400 | 109 | 1.12 | 5.0 |
| 5200 | 254 | 1.11 | 5.0 |

Figure 7A:
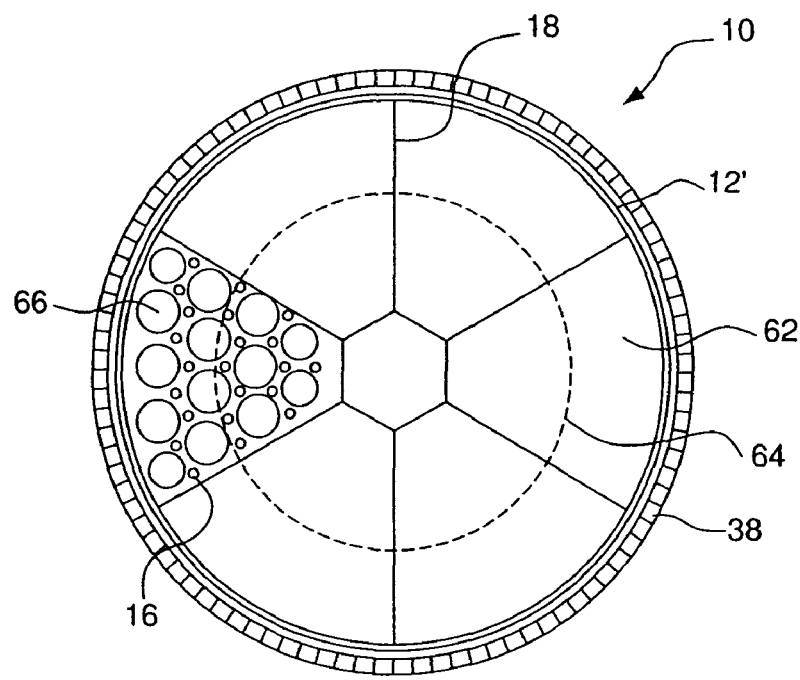
FIG. 7A is a schematic diagram illustrating a plan view of an embodiment of a Category II redistributor of the present invention.

*Conditions: 10% of total flow is collected on wall; 5 gpm/ft2 total liquid flux; Argon/Oxygen 50/50 Mix Referring to FIGS. 7A–7B, Category II redistributors 10 consist of a perforated plate 62 attached to either a fixed or floating wall-flow collector (12,12'), as described above. Alternatively, the wall-flow collector may be made of two channel rings 63 which are welded directly to the inner perimeter of the column wall 24 and "sandwich" the perforated deck. The overall height of the channel rings may be very small (e.g., 30 mm), since the open area in the perforated deck may be chosen so that there need not be any appreciable froth on the deck. The open area may be as high as 70% (e.g., closest-packed arrangement of 90 mm holes on 114 mm centers). FIG. 7A shows a plan view of an example hole pattern in a Category II redistributor, while FIG. 7B shows a cut-away view of a channel-ring type wall-flow collector.

Liquid may leave the wall-flow collector and spill onto the perforated deck at discrete points or continuously around the periphery. The perforated deck may be a circle or a ring with an optional boundary 64, as shown in FIG. 7A.

Figure 7B:
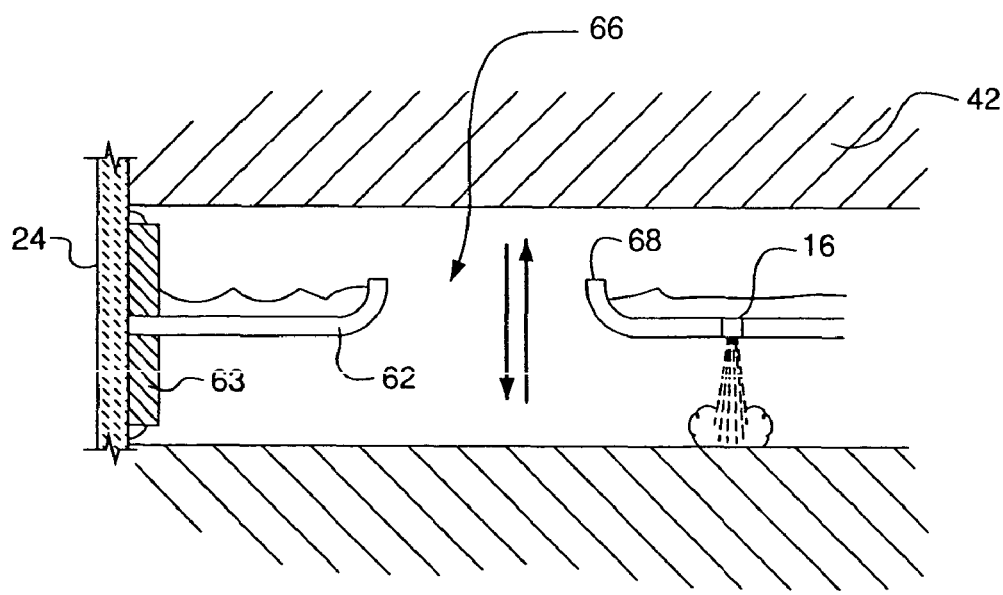
FIG. 7B is a schematic diagram illustrating a partial cross-sectional side view of a column wall and a portion of the Category II redistributor shown in FIG. 7A.

Peferring to FIGS. 7A and 7B, large perforations 66 in the deck 62 can be made with a turret press to produce a protruding rim 68 of 4–8 mm in height which can be used as a barrier for liquid flow. Additional small holes 16 (without protrusions) can be used to redistribute the liquid captured from the wall and the structured packing above.

Figure 8:
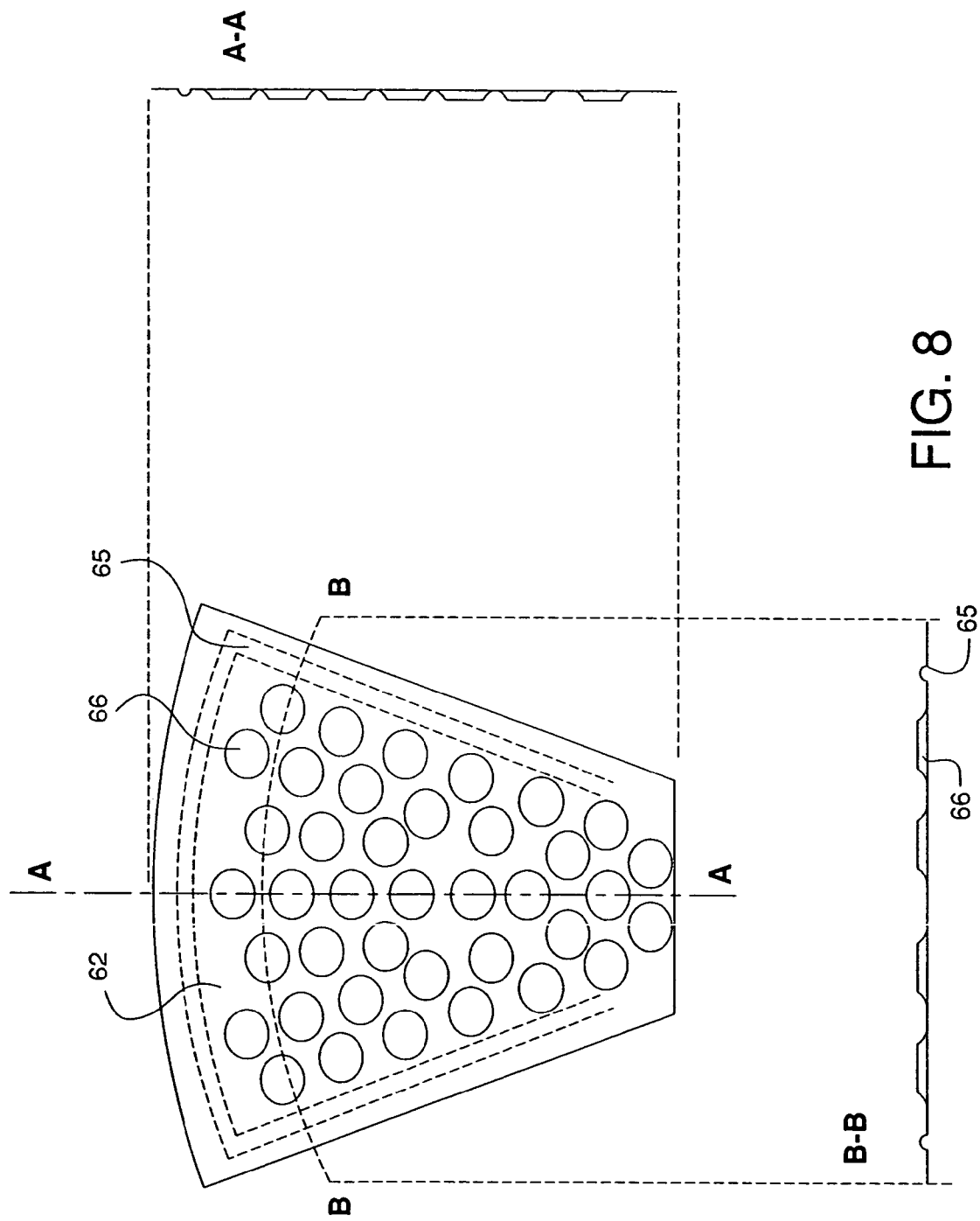
FIG. 8 is schematic diagram illustrating a plan view and two cross-sectional side views of a pie-shaped section of a deck of a Category II redistributor of the present invention.

As shown in FIGS. 7A–7B and FIG. 8, the perforated deck can be made up of separate "pie-shaped" sections. Support braces (not shown) can be used to support the redistributor and maintain the spacing between the structured packing above and below. A turret press can further be used to create short (6 mm) barriers 65, as shown in FIG. 8, by using a ribbing punch. The barriers can be used to direct the liquid from the column wall toward the center of the column.

Category III redistributors consist of a wall-flow collector and projections from the wall-flow collector into the interior of the structured packing. In contrast to Category I and II redistributors, the projections from Category III redistributors and the wall-flow collector are made as one part. One embodiment of this idea is an extended wiper with longer-than-normal notched leg that penetrates about 50 mm or more into the structured packing, instead of the typical 12–25 mm.

Figure 9A:
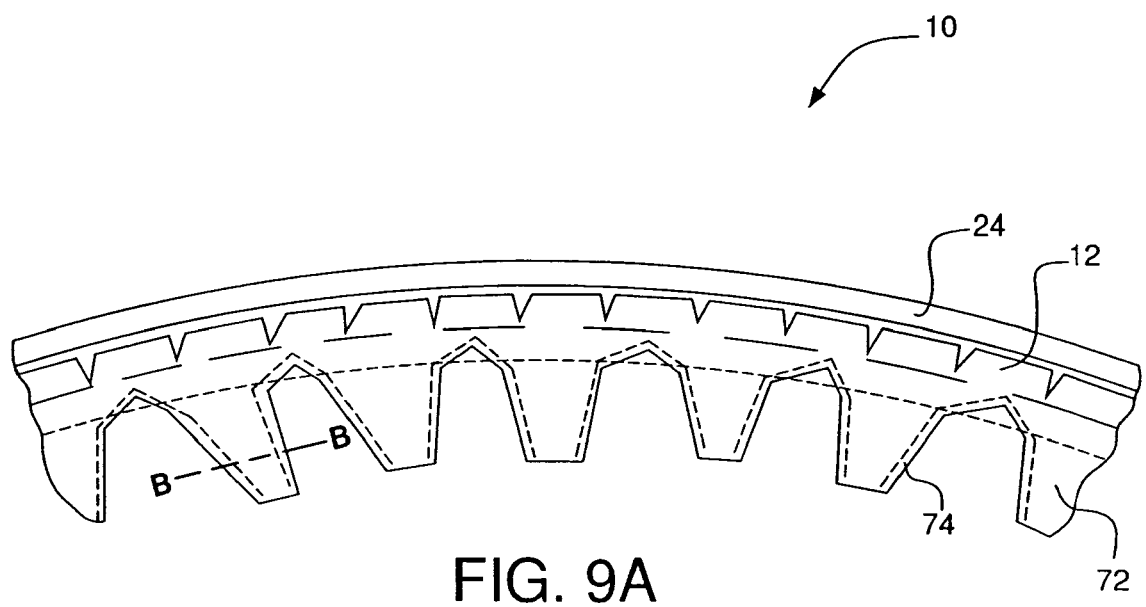
FIG. 9A is a schematic diagram illustrating a plan view of a portion of a Category III redistributor of the present invention.
Figure 9B:
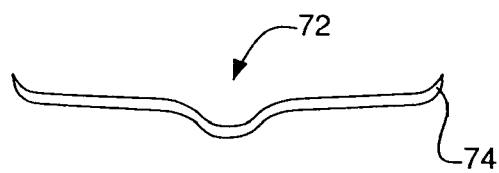
FIG. 9B is a schematic diagram illustrating a cross-sectional side view of one embodiment of an extended wiper used in the Category III redistributor shown in FIG. 9A.

Another embodiment is shown in FIGS. 9A–9B in which each projection 72 is formed with the turret punch as a small trough of ~6 mm height. A ribbing tool is again used to create a barrier 74. In this manner, liquid captured at the wall is conveyed farther into the interior of the structured packing than with the typical wiper. A short spacer grid (not shown) may be required to maintain a constant distance between packed layers above and below this redistributor over the column cross-section.

Figure 10A:
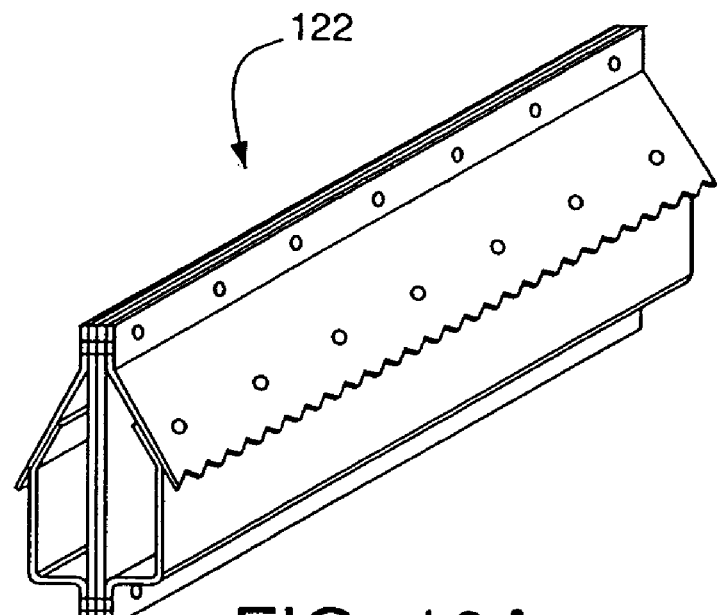
FIGS. 10A and 10B are schematic diagrams illustrating perspective views of two variations of trough/support beams which may be used in Category I redistributors of the present invention.
Figure 10B:
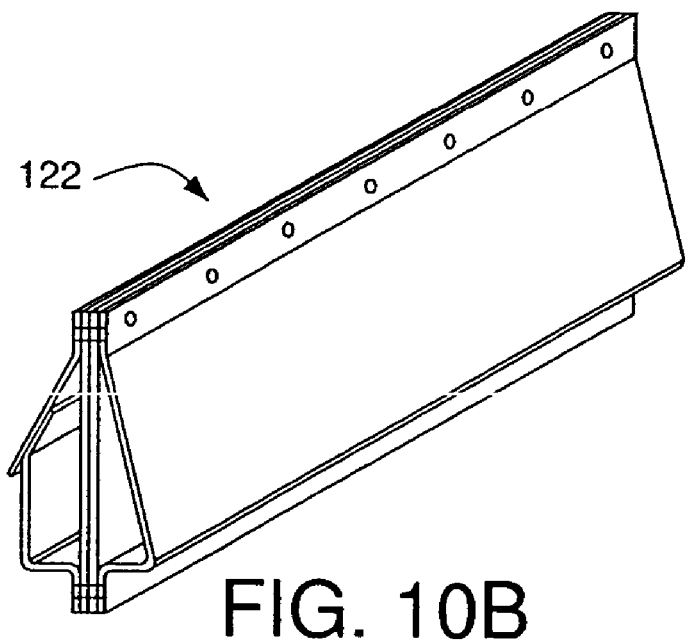

Combining the functions of supporting the packing above and distributing liquid captured from the wall region to the structured packing below saves cost and maximizes area for flow of ascending vapor. Such designs are useful in Category I redistributors. A further modification to troughs or combined trough/structural support beams is to elevate the bottom of the trough relative to the irrigated structural packing below. Doing so has the benefit of allowing for better disengagement of the counter-flowing liquid and gas directly beneath the trough, and will facilitate higher gas and liquid flows before the onset of hydraulic flood. Examples of such combined trough/structural support beams 122 are shown in FIGS. 10A and 10B. These are composed of several laminated plates of thin metal, which allows the use of inexpensive fasteners rather than welding, which would be required if thicker beams were used.

Some of the benefits and advantages of the redistributors of the present invention are:
  i. Capture the liquid on the wall of the column or the wall-region of the structured packing and redistribute the liquid far into the interior of the packing, away from the column wall.
  ii. Require relatively little additional column height and associated cost—this is the result of having to handle only the liquid at the column periphery, not the full liquid flow. Thus, the proposed redistributors need not be tall.
  iii. Require relatively little added manufacturing cost. Because of the modest size of the redistributors, material and labor costs are far less than that required to build a standard liquid distributor, for example. Furthermore, extremely uniform liquid distribution is not required of these redistributors, since their main function is to allow compositional mixing to occur in the structured packing below.
  iv. Do not cause any significant added pressure drop in the vapor phase.
  v. Can be integrated with conventional holddown grate/support grate designs.
  vi. Address the major mechanism contributing to liquid maldistribution in packed columns, that of the interaction of the liquid with the packing periphery/column wall.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An apparatus for collecting and redistributing a flow of a liquid descending in an exchange column having a longitudinal axis, a cross-sectional area, and an inner wall having an inner perimeter, the exchange column containing a first layer of structured packing and a second layer of structured packing above the first layer of structured packing, each of the first and second layers of structured packing having an exterior surface spaced apart from the inner wall, comprising:
  a wall-flow collector disposed in the exchange column above the first layer of structured packing and below the second layer of structured packing, the wall-flow collector being fixedly attached to the inner wall and adapted to collect at least a portion of the liquid descending on or near the inner wall of the exchange column;
  at least one beam disposed in the exchange column between the first layer of structured packing and the second layer of structured packing, each beam adapted to support at least a portion of the second layer of structured packing and each beam having a first end, a second end opposite the first end, and an elongated channel, having an open top and a floor, between the first end and the second end, the elongated channel being in fluid communication with the wall-flow collector and adapted to transmit at least a portion of the collected liquid collected by the wall-flow collector toward the longitudinal axis a substantial distance across the cross-sectional area of the exchange column;
  at least one aperture in the floor of the channel of each beam for dispensing at least a portion of the collected liquid from the channel of the beam to the first layer of structured packing; and
  at least one wiper adjacent the inner wall of the exchange column or the exterior surface of the structured packing, the wiper being located above the beam and adapted to transfer at least a portion of the liquid descending on or near the inner wall into the channel of the beam.

2. An apparatus for collecting and redistributing a flow of a liquid descending in an exchange column having a longitudinal axis, a cross-sectional area, and an inner wall having an inner perimeter, the exchange column containing a first layer of structured packing and a second layer of structured packing above the first layer of structured packing, each of the first and second layers of structured packing having an exterior surface spaced apart from the inner wall, comprising:
- a wall-flow collector disposed in the exchange column above the first layer of structured packing and below the second layer of structured packing, the wall-flow collector being movable in a vertical direction along the longitudinal axis within the exchange column and adapted to collect at least a portion of the liquid descending on or near the inner wall of the exchange column;
- at least one beam disposed in the exchange column between the first layer of structured packing and the second layer of structured packing, each beam adapted to support at least a portion of the second layer of structured packing and each beam having a first end, a second end opposite the first end, and an elongated channel, having an open top and a floor, between the first end and the second end, the elongated channel being in fluid communication with the wall-flow collector and adapted to transmit at least a portion of the collected liquid collected by the wall-flow collector toward the longitudinal axis a substantial distance across the cross-sectional area of the exchange column;
- at least one aperture in the floor of the channel of each beam for dispensing at least a portion of the collected liquid from the channel of the beam to the first layer of structured packing; and
- at least one wiper adjacent the inner wall of the exchange column or the exterior surface of the structured packing, the wiper being located above the beam and adapted to transfer at least a portion of the liquid descending on or near the inner wall into the channel of the beam.

3. An apparatus for collecting and redistributing to a first layer of structured packing disposed in an exchange column a flow of a first liquid descending on or near an inner wall of the exchange column, the exchange column having a longitudinal axis and a cross-sectional area, the inner wall having an inner perimeter, and the exchange column containing the first layer of structured packing and a second layer of structured packing above the first layer of structured packing, each of the first and second layers of structured packing having an exterior surface spaced apart from the inner perimeter of the inner wall, comprising:
- a wall-flow collector disposed in the exchange column above the first layer of structured packing and below the second layer of structured packing, the wall-flow collector having an outer perimeter adjacent the inner perimeter of the inner wall and being fixedly attached to the inner wall and adapted to collect at least a portion of the liquid in the first flow of the liquid descending on or near the inner wall of the exchange column without collecting a substantial portion of the liquid in a second flow of the liquid descending in the exchange column away from the inner wall;
- at least one beam disposed in the exchange column between the first layer of structured packing and the second layer of structured packing, the beam adapted to support at least a portion of the second layer of structured packing and the beam having a first end, a second end opposite the first end, and an elongated channel, having an open top and a floor, between the first end and the second end, the elongated channel being in fluid communication with the wall-flow collector and adapted to transmit at least a portion of the collected liquid collected by the wall-flow collector away from the inner perimeter of the inner wall a substantial distance across the cross-sectional area of the exchange column;
- a plurality of apertures in the floor of the channel of the beam for dispensing at least a portion of the collected liquid from the channel of the beam to the first layer of structured packing at a plurality of locations spaced apart over the substantial distance across the cross-sectional area of the exchange column; and
- at least one wiper adjacent the inner perimeter of the inner wall of the exchange column, the wiper being located above the beam and adapted to transfer at least a portion of the liquid in the first flow of the liquid descending on or near the inner wall into the channel of the beam.

4. An apparatus for collecting and redistributing to a first layer of structured packing disposed in an exchange column a first flow of a liquid descending on or near an inner wall of the exchange column, the exchange column having a longitudinal axis and a cross-sectional area, the inner wall having an inner perimeter, and the exchange column containing the first layer of structured packing and a second layer of structured packing above the first layer of structured packing, each of the first and second layers of structured packing having an exterior surface spaced apart from the inner perimeter of the inner wall, comprising:
- a wall-flow collector disposed in the exchange column above the first layer of structured packing and below the second layer of structured packing, the wall-flow collector having an outer perimeter adjacent the inner perimeter of the inner wall and being movable in a vertical direction along the longitudinal axis within the exchange column and adapted to collect at least a portion of the liquid in the first flow of the liquid descending on or near the inner wall of the exchange column without collecting a substantial portion of the liquid in a second flow of the liquid descending in the exchange column away from the inner wall;
- at least one beam disposed in the exchange column between the first layer of structured packing and the second layer of structured packing, the beam adapted to support at least a portion of the second layer of structured packing and the beam having a first end, a second end opposite the first end, and an elongated channel, having an open top and a floor, between the first end and the second end, the elongated channel being in fluid communication with the wall-flow collector and adapted to transmit at least a portion of the collected liquid collected by the wall-flow collector away from the inner perimeter of the inner wall a substantial distance across the cross-sectional area of the exchange column;
- a plurality of apertures in the floor of the channel of the beam for dispensing at least a portion of the collected liquid from the channel of the beam to the first layer of structured packing at a plurality of locations spaced apart over the substantial distance across the cross-sectional area of the exchange column; and
- at least one wiper adjacent the inner perimeter of the inner wall of the exchange column, the wiper being located above the beam and adapted to transfer at least a portion of the liquid in the first flow of the liquid descending on or near the inner wall into the channel of the beam.

* * * * *